United States Patent Office 2,838,960
Patented June 17, 1958

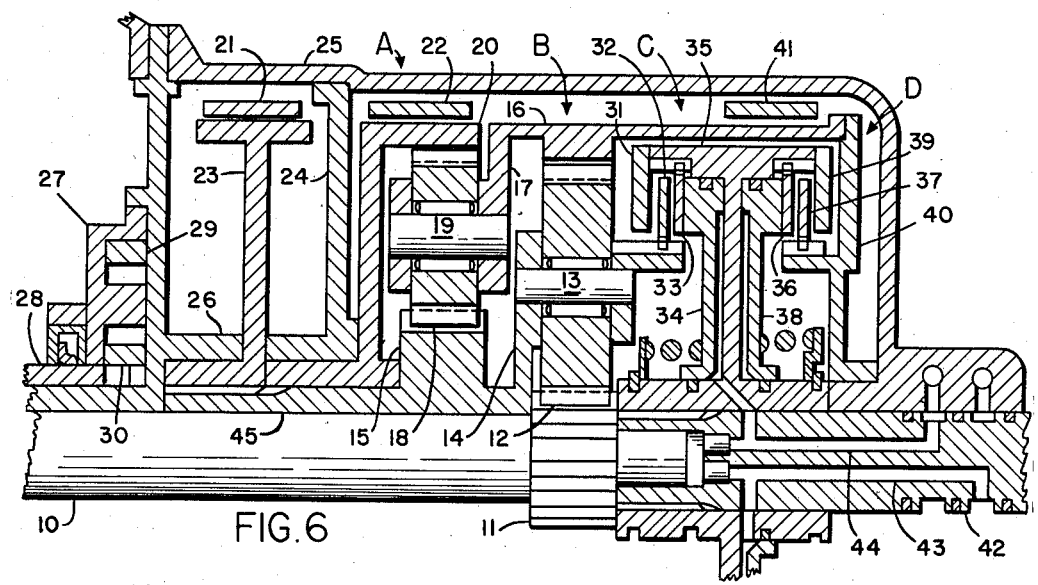
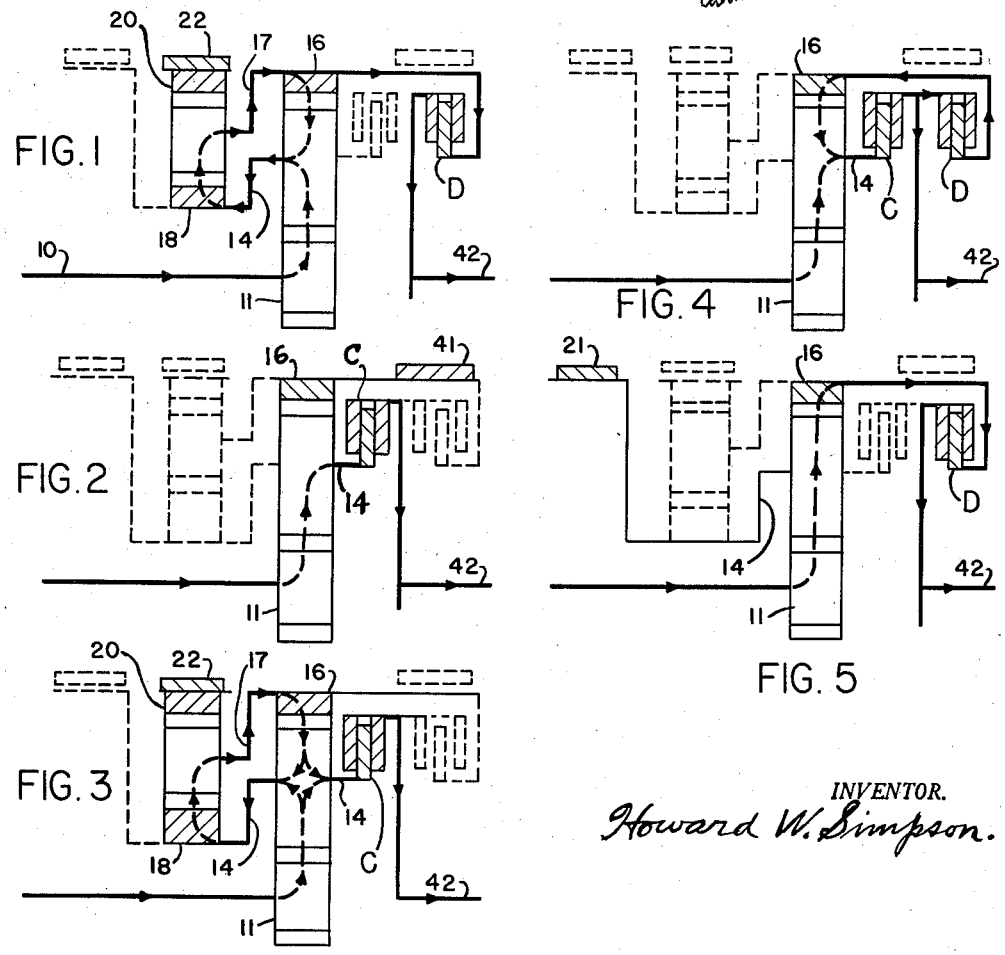

2,838,960

TRACTOR TRANSMISSION

Howard W. Simpson, Dearborn, Mich.

Application October 1, 1956, Serial No. 613,200

7 Claims. (Cl. 74—759)

This invention relates to a four speed and reverse transmission for self propelled vehicles, preferably for farm and industrial wheeled tractors.

It is a novel combination of two simple planetary gear sets, two friction clutches and three friction brakes for holding reaction members. The clutches are shown in the drawing as operated by hydraulic pressure and the brake bands shown are also intended to be so operated but hydraulic servo mechanism for these is not shown because such structure is well known to those skilled in the art.

A novel feature of this disclosure is my arrangement of the above elements to provide selective coupling of the two gear sets in differential relationship in two different ways to produce first and third speeds and in addition to use each gear set separately to produce second and reverse speeds. Fourth or high speed is obtained by locking up the gears in direct drive. An object of the invention is therefore to obtain a greater number of speeds than is ordinarily possible from two simple planetary gear sets.

Another object is to reduce clutch plate differential speeds in order to reduce clutch drag in the three reduction speeds and reverse when one of the clutches is open. For instance in the present disclosure the clutch plate differential in low and third speed is less than 17% of input speed, and is 19% in second and 23% in reverse. These relative speeds are so low that drag losses are negligible. This is important in vehicles such as tractors which work under heavy load continuously in a reduction gear. Unless clutch plate differentials are low there is danger of overheating due to the constant frictional drag of multiple plate transmission clutches such as used in a commercial application of this invention.

Another object is to provide gearing which is inherently quiet by virtue of low tooth engagement speeds which I have provided in this disclosure.

Another object is to provide a simple low cost unit in which two simple gear sets are used with a single clutch housing for the two clutches.

Another object is to provide a transmission in which the gear elements are compactly grouped at the front end of the housing and the dual clutches at the rear end for easy access to hydraulic pressure without the necessity of multiple sealing glands.

Although the gear train in this disclosure belongs to the same family of dual differential trains as shown and described in my pending United States Patent 2,786,369 and application S. N. 605,018 filed August 20, 1956, the results obtained are different in each case and the transmissions are adapted for different types of vehicles in each case.

For instance in the present disclosure the step between third and fourth speed is 250% which is much greater than in S. N. 335,495 and would be prohibitive for an automobile or truck but is satisfactory for a wheeled tractor, especially when a fluid coupling or torque converter is used. The range of ratios in the present disclosure are also much greater than in United States Patent 2,786,369, which adapts it to wheeled tractors used for both slow field operations as well as on highways.

Another object is to provide a transmission with a wide range of gear ratios. Another object is to provide a four speed transmission in which the steps between the first three reduction ratios are comparatively small but the step between 3rd speed and direct drive is very large. This provides 3 slow speeds for plowing and other field work and a much faster speed for use on paved roads.

Since wheeled tractors are seldom used to work in a backward direction, one reverse ratio is often adequate and the cost of providing several reverse speeds is avoided. Consequently the single reverse speed must be carefully determined and a compromise reached by having the reverse speed considerably faster than low speed to facilitate quick maneuvering but slow enough to enable the tractor to back up under load.

Another object of the present disclosure is therefore to provide a reverse speed in which the ratio is always equal to the numerical value of the second speed reduction ratio minus one.

In the case S. N. 605,018, three speeds forward and two in reverse are obtained (instead of four speeds forward and one reverse) and it is therefore better adaptable to track type tractors.

Another important object is therefore to provide a transmission which is uniquely adapted to use in wheeled tractors.

The drawings Figs. 1 to 5 are diagrammatic partial elevations in section showing the path of power through the gears and clutches and with the working gears, clutches and brakes shown in solid lines and the nonworking parts shown in dotted lines. Figs. 1 to 5 represent low, second, third, fourth and reverse speeds respectively.

Fig. 6 is a partial elevation in section of a preferred embodiment of the invention in simplified form with parts such as bushings, washers, bolts, etc., omitted for the sake of clarity. Also the clutches have only one driving plate whereas in actual practice several are used.

In Fig. 6 gear set A comprises sun gear 15, meshing with planet gears, one of which, 18, is shown mounted on rolls on pin 19 fixed in carrier 17, and ring gear 20 which is journaled on plate 24 attached to housing 25.

Gear set B comprises sun gear 11 integral with input shaft 10 and meshing with planet gears, one of which, 12, is shown mounted on rolls on pin 13 fixed in carrier 14, and ring gear 16 which is integral with carrier 17 and is also adapted to act as a brake drum for brake band 41. Brake band 41 can be contracted to hold ring gear 16 as a reaction member.

Brake drum 23 is splined to hub 45 of sun gear 15, and is journaled in housing end plate 26 and has a brake band 21 which when contracted on drum 23, holds sun gear 15 and carrier 14 stationary. Brake band 22 can be contracted to hold ring gear 20 as a reaction member.

Clutch C has sliding plate 32 splined to carrier 14, sliding plate 33 splined to housing 35, pressure plate 31 fixed to housing 35 and piston 34 which can be moved axially to engage clutch plates 32 and 33 against pressure plate 31, by oil pressure through passage 44.

Clutch D has sliding plate 37 splined to flange 40 which is fixed to ring gear 16, sliding plate 36 which is splined to housing 35, pressure plate 39 which is fixed to housing 35 and piston 38 which compresses sliding plates 36 and 37 against pressure plate 39 by means of oil pressure through passage 43.

Clutch housing 35 is splined to output shaft 42. Input shaft 10 is journaled in hub 45 and plate 26 and is piloted in the end of output shaft 42. Oil pump gear 30 is driven by sleeve 28 and meshes with internal gear 29 in housing 27.

In Figs. 1 to 5 input shaft 10 drives sun gear 11 in all cases. In Fig. 1, low speed, ring gear 20 is held by brake band 22 and carrier 17 is the output member with the torque of ring gear 16 fed back as indicated by arrows. Clutch D engages to transmit the net output torque to output shaft 42. If ring gears 20 and 16 have 102 teeth and sun gears 18 and 11 have 72 teeth and 24 teeth respectively the reduction ratio is $$\left[\frac{102+72}{72} \times \frac{102+24}{24}\right] - \frac{102}{24} = 8.45 : 1$$

In Fig. 2, second speed, ring gear 16 is held by brake band 41 and clutch C transmits the torque of carrier 14 to output shaft 42. The reduction ratio is $$\frac{102+24}{24} = 5.25 : 1$$

In Fig. 3, third speed, brake band 22 holds ring gear 20 as a reaction member as in Fig. 1. A portion of the torque of sun gear 11 and ring gear 16 is fed back through the gears via carrier 14 and the remaining torque of carrier 14 is transmitted by clutch C to output shaft 42. The reduction ratio is, $$\frac{102+24}{24} - \left[\frac{72}{102+72} \times \frac{102}{24}\right] = 3.5 : 1$$

In Fig. 4, fourth speed, both clutches C and D are engaged which locks up the gearing in direct drive, with torque paths as indicated.

In Fig. 5, reverse speed, carrier 14 is held by brake band 21 and ring gear 16 is turned backward with a reduction ratio of $$\frac{102}{24} = 4.25 : 1$$

The above ratios are well adapted for a wheeled farm or industrial tractor and typical travel speeds corresponding to these ratios are 1.5, 2.4, 3.6 and 12.6 miles per hour forward and 3.0 miles per hour in reverse. This provides three speeds for field and off-highway work and a high speed for highway travel and hauling.

Although my invention is described primarily as a tractor transmission there is no doubt of many other possible applications.

Also it will be understood that numerous modifications might be made to the embodiment shown and described without departing from the scope of the invention as defined in the following claims.

I claim:

1. In a power transmission, first and second planetary gear sets, each set comprising a sun gear, a ring gear and a rotatable carrier on which are mounted planet gears each meshing with both the said sun and ring gear, means for holding the ring gear of the first gear set as a reaction member, first means for coupling the first set carrier and second set ring gear to an output shaft, second means for coupling the first set sun gear and second set carrier to said output shaft and a driving connection between an input shaft and the sun gear of the second gear set; means for holding the second set carrier as a reaction member and means for holding the second set ring gear as a reaction member, said coupling and holding means being adapted, upon successive operation, to provide at least three forward speed reduction ratios and one reverse reduction ratio, the numerical value of the reverse ratio being always one less than that of the second speed ratio.

2. In a power transmission, first and second planetary gear sets each set comprising a sun gear, a ring gear, a carrier on which are mounted planet gears each meshing only with both the said sun and ring gear, a brake for holding the ring gear of the first gear set as a reaction member, a first clutch for coupling the first set carrier and second set ring gear to an output shaft, a second clutch for coupling the first set sun gear and second set carrier to said output shaft, and a driving connection between an input shaft and the sun gear of the second gear set; a brake for holding the second set carrier and a brake for holding the second set ring gear, said clutches and brakes being adapted, upon successive operation, to provide a plurality of forward speed reduction ratios and a reverse reduction ratio, the numerical value of the reverse ratio being always less by unity than that of the second speed ratio.

3. In a power transmission of the planetary type, a reduction ratio drive between an input and output shaft comprising a ring gear and means for holding it as a reaction member, a rotatable carrier having planet gears meshing with said ring gear, a sun gear meshing with said planet gears, a second ring gear drivingly coupled to said carrier and a clutch for coupling said second ring gear to the output shaft, a second carrier with planet gears meshing with said second ring gear, a driving connection between said second carrier and said sun gear, a clutch for coupling said second carrier to the output shaft, and a second sun gear meshing with the planet gears of said second carrier and drivingly coupled to the input shaft; a brake for holding said second carrier and a brake for holding said second ring gear, said clutches and brakes being adapted, upon successive operation, to provide a plurality of forward speed reduction ratios and a reverse speed reduction ratio, the numerical value of the reverse ratio being always less by one than that of the second speed ratio.

4. In a power transmission, first and second planetary sets, each set having sun, ring and planet carrier elements, an input shaft driving the sun of the second set, selectively engageable means for holding the ring of the first planetary set, selectively engageable means for holding the ring of the second set, selectively engageable means for holding the carrier of the second set, means for coupling the first set carrier and second set ring to each other and to an output shaft, and means for coupling the first set sun and second set carrier to each other and to said output shaft; said holding and coupling means adapted, upon successive operation, to provide a plurality of forward speed reduction ratios and one reverse speed reduction ratio, the numerical value of said reverse ratio being equal to the numerical value of the second speed ratio minus one.

5. A variable speed transmission for an automotive vehicle comprising input and output members, first and second planetary gear sets each having rotatable interengaging sun, ring and planet gears and a planet gear carrier, the second sun gear being driven by the input member, means for effecting a plurality of drive ratios between said input and output members, said means including first and second selectively engageable clutches and a plurality of brakes adapted upon successive operation to provide a first forward ratio when the first ring gear is held stationary, the first carrier and second ring gear are driven at output speed, the first clutch is engaged and the second clutch is released and wherein the first sun gear and second carrier rotate together; a second forward ratio when the first clutch is released and the second clutch engaged, the first ring gear is released and the second ring gear is held stationary; a third forward ratio when the first clutch is released and the second engaged, the first ring gear is held stationary, the first sun gear and second carrier are driven at output speed and wherein the first carrier and second ring gear rotate together; a forward direct drive with both clutches engaged wherein both gear sets are locked up; and a reverse reduction ratio when the first clutch is engaged, and the second released, the second carrier is held stationary, the first ring gear is released and the second ring is driven at output speed; the numerical value of the reverse ratio being less by one than the numerical value of the second speed ratio.

6. In a variable speed power transmission, input and output shafts, first and second planetary gear sets each comprising sun, ring and planet gears and a planet gear carrier, a first clutch for coupling the first set carrier and second set ring gear to the output shaft and a first brake for holding said first set carrier and second set ring gear against rotation, a second clutch for coupling the first set sun gear and second set carrier to the output shaft and a second brake for holding said first set sun gear and second set carrier against rotation, a third brake for holding the first set ring gear against rotation and a driving connection between the input shaft and the second gear set sun gear whereby selective engagement of said clutches and brakes provides three forward reduction ratios and one reverse speed ratio between the input and output shafts, one of each of said clutches and brakes being engaged in each of said forward and reverse speeds; the numerical value of the reverse ratio being equal to that of the second speed ratio minus one.

7. A variable speed power transmission comprising power input and output members, a first planetary gear set having an element adapted to be releasably held as a reaction member, a second planetary gear set having an element driven by said power input member, a driving connection between second elements of each gear set, a driving connection between third elements of each gear set, a brake connection for holding said interconnected second elements against rotation, a brake connection for holding said interconnected third elements against rotation, a selectively engageable clutch connection between said interconnected second elements and said output member and a selectively engageable clutch connection between said interconnected third elements and said output member; said clutch and brake connections being adapted, upon successive operation, to provide a plurality of forward speed reduction ratios and a reverse speed reduction ratio, the numerical value of the reverse ratio being equal to that of the second speed ratio minus one.

References Cited in the file of this patent

UNITED STATES PATENTS

| | | |
|---|---|---|
| 2,301,451 | Pollard | Nov. 10, 1945 |
| 2,786,369 | Simpson | Mar. 26, 1957 |